UNITED STATES PATENT OFFICE.

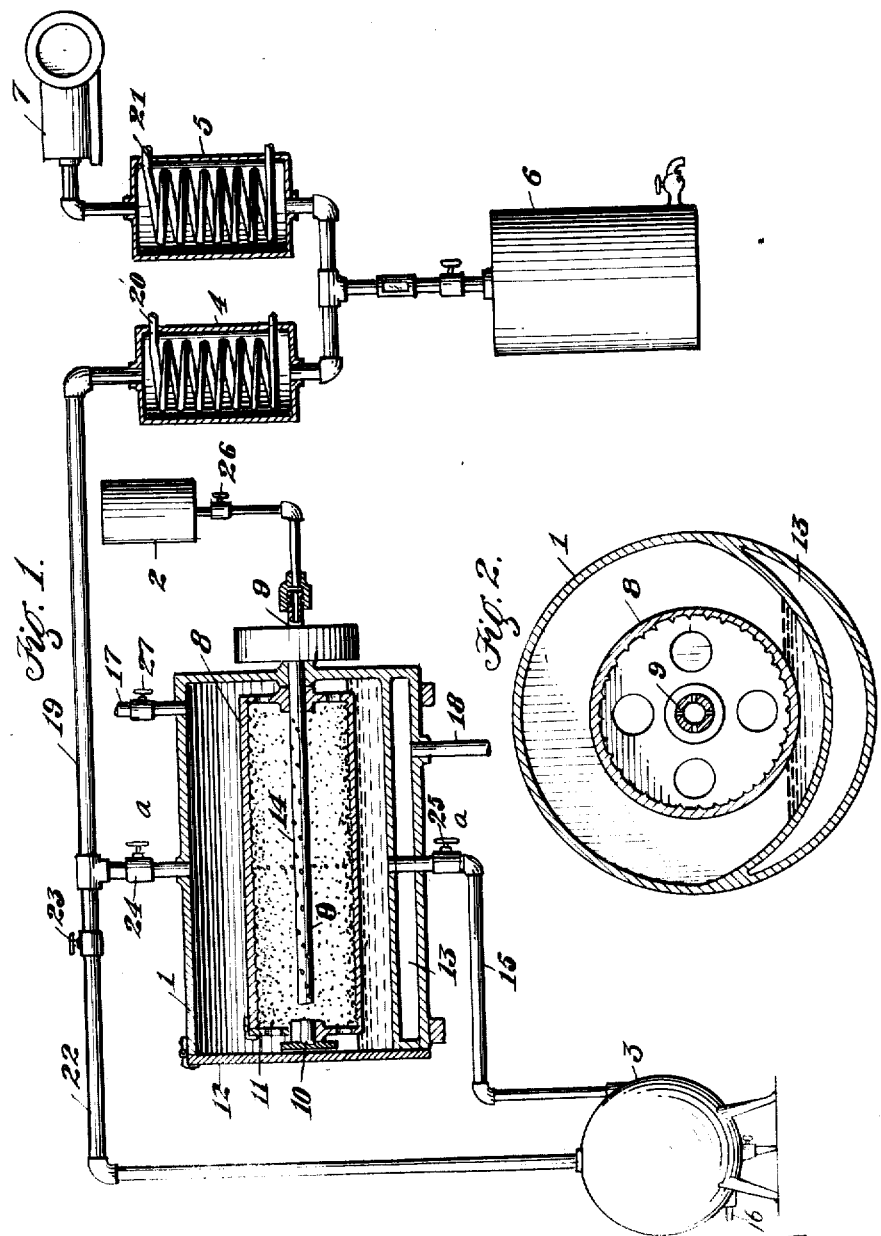

EDWARD J. SHEEHAN, OF PASADENA, CALIFORNIA, ASSIGNOR OF ONE-HALF TO WILLIAM S. McCAY, OF PASADENA, CALIFORNIA.

EXTRACTING ESSENTIAL OILS.

1,211,969.  Specification of Letters Patent.  Patented Jan. 9, 1917.

Application filed February 8, 1915. Serial No. 6,733.

*To all whom it may concern:*

Be it known that I, EDWARD J. SHEEHAN, a citizen of the United States, residing at Pasadena, in the county of Los Angeles and State of California, have invented new and useful Improvements in Extracting Essential Oils, of which the following is a specification.

My invention relates to a process for extracting essential oils, and especially a process for extracting essential oils from vegetable matter.

One of the features of my invention is the use of components of the oil of the vegetable matter itself as a solvent in extraction.

More particularly, my process is adapted for extracting the essential oils from citrus fruits, whence approximately all of oil contained in the fruit to be treated is obtained without changing its chemical characteristics, and giving the finished product the flavor and fragrance as it occurs in nature.

Another feature of my process where heat is used is keeping the material in constant motion so that it is uniformly heated, thereby preventing decomposition of tissues, which tissues would by decomposition, change the characteristics of the oil.

In the step of my process where steam distillation takes place, a still further feature is the separation of the aldehydes and components of the essential oil in solution in the condensed steam.

An embodiment of my invention as applied to citrus fruits is as follows: The fruit is put into a cylinder, having puncturing and rasping means and the cylinder rotated. A solvent obtained from the essential oil is then run or sprayed onto the fruit while the latter is in motion. The extract is collected in a vacuum still as it runs off the fruit; the oil and solvent remaining on the fruit and in the cylinder is removed by vacuum distillation by passing vapors through the treated fruit thus entraining and distilling the adhering solvent and oil. This is accomplished at a low temperature under vacuum. The oil recovered by the distillation step is separated from the condensed vapors and mixed with the extract in the still. The aldehydes and components soluble in the condensed vapors are separated therefrom and also mixed with the extract in the still. The result is a finished product, a part of which is withdrawn and the remainder distilled under low temperature; the volatile parts being condensed and used as a solvent for another cycle, while the parts not volatilized at a low temperature, and hereafter called non-volatile parts, are retained in the still.

The accompanying drawing shows an apparatus for carrying out my process.

Figure 1 is a diagrammatic view partly in elevation, and partly in section. Fig. 2 is a cross section on the line *a—a*.

The apparatus comprises a casing 1, a solvent container 2, a receptacle 3, which is also a still, condensers 4 and 5, a tank 6, and a vacuum pump 7. The casing 1 carries a drum 8 adapted to receive fruit to be treated. The drum 8 is mounted to rotate upon a hollow shaft 9 and a stub-shaft 10. The drum has a hinged door 11 which permits the loading and removal of the fruit. At one end of the casing a hinged door 12 is arranged which can be fastened in a closed position by means of clamps or any suitable device. It permits access to the drum during the loading and unloading of the same.

A steam jacket 13 is located at the lower end of the casing. The hollow shaft 9 carries an extension 14 which is a perforated pipe and is used for the purpose of spraying a solvent upon the fruit as it is revolved. The hollow shaft is carried through piping to the solvent container 2. Connected to the casing 1 is a pipe 15 leading to the container or still 3. The valve control pipe 17 is connected to the casing and to a source of water. Pipe 18 is connected to the steam jacket of the casing 1. Valve controlled piping 19 connects to the casing 1 and the condenser 4. The latter has a cooling coil 20 and is carried through piping and a T-elbow to the tank 6 and the condenser 5. The condenser 5 contains cooling coils 21 and is also connected to the vacuum pump 7. Piping 22 leads from the container 3 to piping 19 and is controlled by a suitable valve 23.

The solvent initially used may be obtained from external sources, but in the repetition of the steps of the process, preferably consists of components of essential oils from the skin of fruit corresponding to that contained in the drum. Assuming that an essential oil obtained from the skins of the same character of fruit as that contained in the drum is used, it is placed in container 3 and subjected to the action of heat by the admission of steam through pipe 16 to the container jacket. The vacuum pump 7 is operated, valves 24 and 25 being closed and 23 opened. Some of the volatile components of the essential oil, such as most of the aldehydes and citrals pass over to the condensers 4 and 5. Some of the highly volatile terpenes will also pass over. Some of the non-volatile components and some which require a high temperature for volatilization, such as glucosids will remain in the container 3. The exact composition of the portion of the essential oil volatilized and condensed and the components remaining in the container 3 varies and being organic compositions they have not been determined with definiteness. The condensed volatile components are drawn from the tank 6 and placed in the container 2 for use as a solvent.

The drum 8 is loaded with fruit. Valves 23 and 24 are closed, valve 25 is opened, and the drum is rotated by means of the pulley on the shaft 9. Valve 26 is then opened permitting the solvent to pass through the fruit while in motion, and drained into the container 3. When no further extract is dissolved from the fruit by the solvent, valves 25 and 26 are closed and valve 24 opened. Valve 27 is opened to admit water, and steam is admitted through the pipe 18 into the steam jacket. The steam formed entrains and vaporizes the remaining oil and solvent which is carried over to the condenser 20; the pump 7 being placed in operation during this distilling process. The condensed liquids enter the tank 6 while those portions which have not been condensed in condenser 20, are condensed in condenser 5. The oil and water containing components of the essential oil in solution are separated by gravity in the tank 6, and the oil is removed and conveyed to the tank 3. The water containing in solution components of the essential oil is dehydrated by freezing, the water becoming solidified and separated from the aldehydes, citrals and other components, leaving components which are then conveyed to the container 3. The container now has a finished product, a part of which is withdrawn. The remainder is distilled to obtain a solvent for a new cycle. Valves 24 and 25 are closed. Valve 23 is opened and steam is admitted through the pipe 16 to the container 3. The volatile portions of the oil are condensed and drained into the tank 6 from which they may be removed to the tank 2; the non-volatile portions remaining in the tank 3. The process is now ready for another cycle in which the condensed volatile oils in tank 6 are used as the solvent, being transferred to container 2 and the non-volatile parts left in tank 3.

What I claim is:

1. A process for extracting essential oils, consisting in distilling an essential oil of the same character as that to be extracted, condensing the volatile constituents for use as a solvent, retaining the non-volatile constituents, rupturing the oil bearing cells of the materials from which the oil is to be extracted, subjecting said materials to the solvent action of said solvent, and combining the solution with said non-volatile constituents.

2. A process for extracting essential oils, consisting in distilling an essential oil of the same character as that to be extracted, condensing the volatile constituents for use as a solvent, retaining the non-volatile constituents, rupturing the oil bearing cells of the materials from which the oil is to be extracted, subjecting said materials to the solvent action of said solvent, agitating the mass during extraction, and combining the solution with said non-volatile constituents.

3. A process for extracting essential oils, consisting in distilling an essential oil of the same character as that to be extracted, condensing the volatile constituents for use as a solvent, retaining the non-volatile constituents, rupturing the oil bearing cells of the materials from which the oil is to be extracted, subjecting said materials to the solvent action of said solvent, draining the solution from said materials, subjecting the residue to the action of heated vapors, condensing said vapors, separating the oil from said vapors, and combining said solution, said non-volatile constituents and oil obtained from said condensed vapors.

In witness that I claim the foregoing I have hereunto subscribed my name this 29th day of January, 1915.

EDWARD J. SHEEHAN.

Witnesses:
ERNEST L. WALLACE,
EDMUND A. STRAUSE.